(12) United States Patent
Vallance et al.

(10) Patent No.: US 9,885,833 B2
(45) Date of Patent: Feb. 6, 2018

(54) OPTICAL FIBER SCRIBING TOOL

(71) Applicant: NANOPRECISION PRODUCTS, INC., El Segundo, CA (US)

(72) Inventors: Robert Ryan Vallance, Newbury Park, CA (US); Eric Marsh, State College, PA (US)

(73) Assignee: NANOPRECISION PRODUCTS, INC., El Segundo, CA (US)

( * ) Notice: Subject to any disclaimer, the term of this patent is extended or adjusted under 35 U.S.C. 154(b) by 775 days.

(21) Appl. No.: 14/031,036

(22) Filed: Sep. 18, 2013

(65) Prior Publication Data

US 2014/0083273 A1 Mar. 27, 2014

Related U.S. Application Data

(60) Provisional application No. 61/702,644, filed on Sep. 18, 2012.

(51) Int. Cl.
*G02B 6/25* (2006.01)
*B26D 3/08* (2006.01)
*H02G 1/12* (2006.01)

(52) U.S. Cl.
CPC .................. *G02B 6/25* (2013.01); *B26D 3/08* (2013.01); *H02G 1/12* (2013.01); *H02G 1/1248* (2013.01); *Y10T 83/0341* (2015.04)

(58) Field of Classification Search
CPC ............. Y10T 83/0341; Y10T 83/0333; Y10T 225/12; Y10T 225/20; Y10T 225/30; Y10T 225/307; Y10T 225/314; G02B 6/25; B26D 3/08; H02G 1/12; H02G 1/1202; H02G 1/1204; H02G 1/1207; H02G 1/1209;
(Continued)

(56) References Cited

U.S. PATENT DOCUMENTS

| 4,203,539 A | 5/1980 | Miller |
| 4,322,025 A * | 3/1982 | Johnson .................. G02B 6/25 |
| | | 225/2 |

(Continued)

FOREIGN PATENT DOCUMENTS

| EP | 0082897 | 4/1986 |
| JP | S5560036 | 5/1980 |

(Continued)

OTHER PUBLICATIONS

International Search Report of Counterpart PCT International Application No. PCT/US2013/060486.
(Continued)

*Primary Examiner* — Phong Nguyen
(74) *Attorney, Agent, or Firm* — Liu & Liu

(57) ABSTRACT

A portable, hand tool for scribing optical fibers in a cleaving process. The scribing tool comprises a body within which the optical fiber is supported for rotation with respect to the body, about an axis within the body. The optical fiber is constrained by supports from movements along its axis. An actuator moves a scribing bit orthogonal relative to the fiber axis. The actuator may be a piezoelectric actuator, such as in a tube that bends under applied voltage. In one embodiment the scribing tool has a single scribing bit. In another embodiment, the scribing tool has multiple (N) scribing bits that can be applied against the optical fiber simultaneously.

21 Claims, 8 Drawing Sheets

(58) Field of Classification Search
CPC .. H02G 1/1212; H02G 1/1248; H02G 1/1251; H02G 1/1253; H02G 1/1256
USPC ............... 30/92, 94, 90.1, 91.2; 81/9.4, 9.51
See application file for complete search history.

(56) References Cited

U.S. PATENT DOCUMENTS

| | | | |
|---|---|---|---|
| 4,644,647 A * | 2/1987 | Szostak | G02B 6/25 225/96 |
| 5,382,276 A * | 1/1995 | Hakoun | G02B 6/25 225/2 |
| 6,634,079 B1 * | 10/2003 | Kazama | G02B 6/25 225/101 |
| 2003/0196533 A1 | 10/2003 | Tabeling | |
| 2005/0109177 A1 | 5/2005 | Wiley et al. | |
| 2006/0042432 A1 * | 3/2006 | Bottcher | G02B 6/25 83/13 |
| 2006/0201982 A1 * | 9/2006 | Yazaki | G02B 6/25 225/1 |
| 2008/0131048 A1 * | 6/2008 | Yoo | G02B 6/3502 385/6 |
| 2011/0247473 A1 | 10/2011 | Beach et al. | |
| 2012/0125166 A1 * | 5/2012 | Hallett | B26D 1/305 83/13 |

FOREIGN PATENT DOCUMENTS

| | | |
|---|---|---|
| JP | S63236002 | 9/1988 |
| JP | H06222292 | 8/1994 |
| JP | H11-160546 | 6/1999 |

OTHER PUBLICATIONS

Preis et al., "Three-Dimensional Micropositioning Device for Optical Fiber Guided by a Piezoelectric Tube", Proceedings of SPIE vol. 5491, Oct. 20, 2004, pp. 1379-1389.

Leung et al., "Development of a 1×2 Piezoelectric Optical Fiber Switch", Proceedings of SPIE vol. 6836, Nov. 5, 2007, pp. 683603-1 to 683603-12.

* cited by examiner

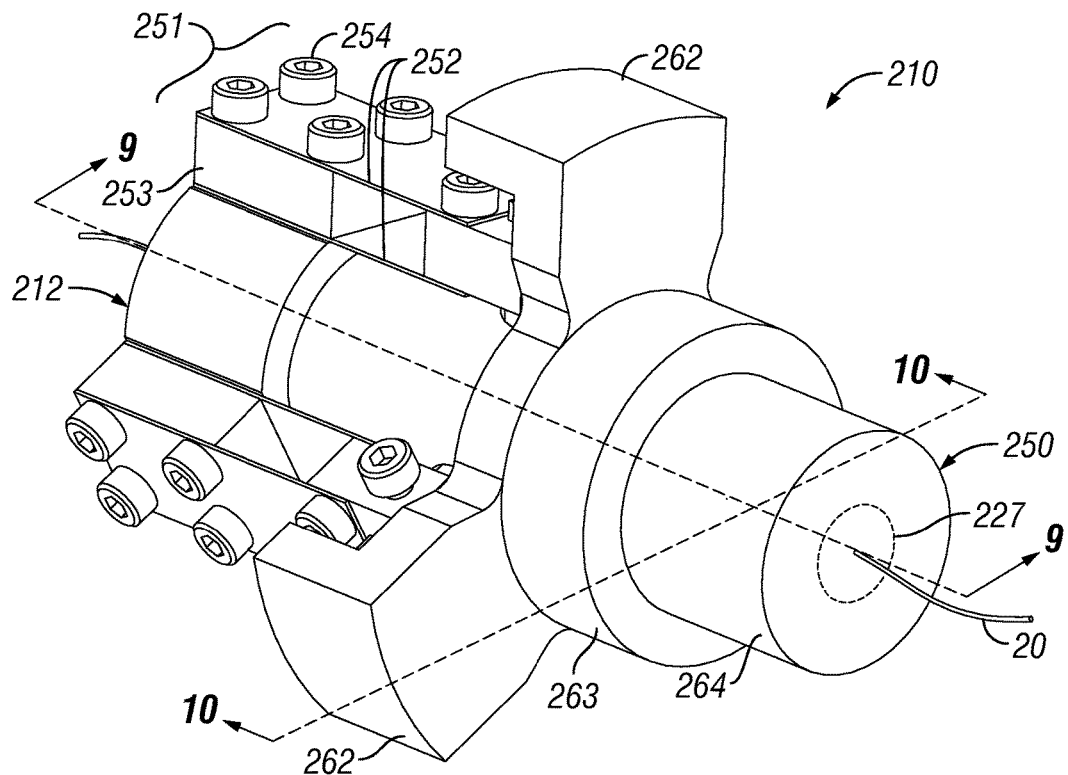
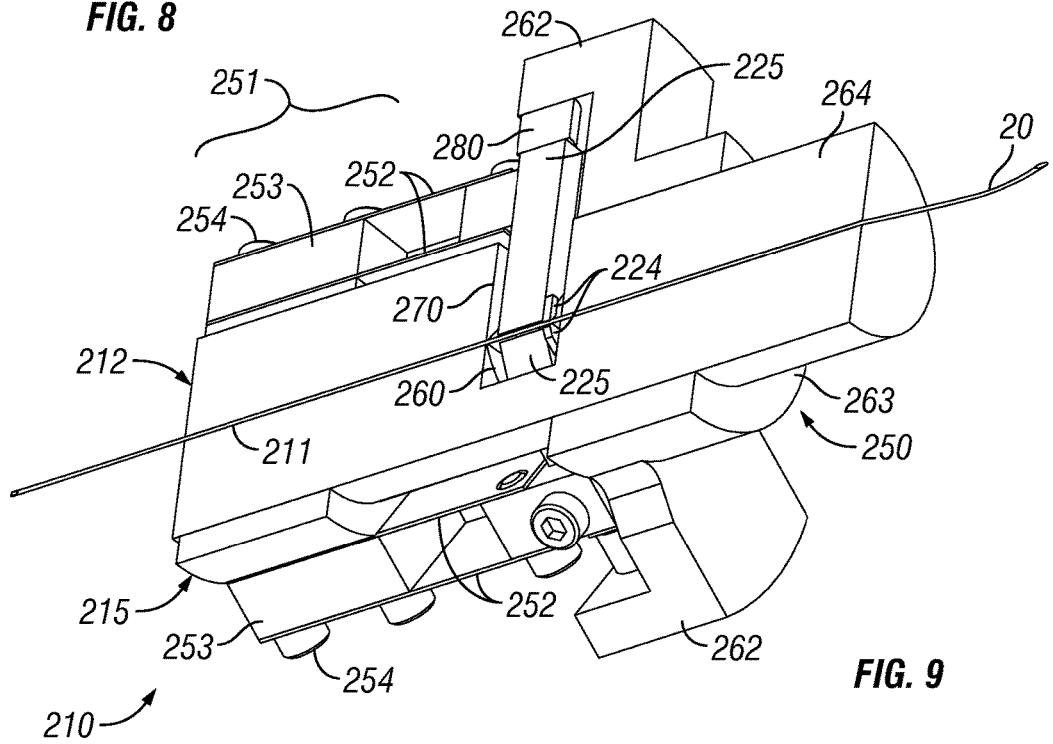

OPTICAL FIBER SCRIBING TOOL

PRIORITY CLAIM

This application claims the priority of U.S. Provisional Patent Application No. 61/702,644 filed on Sep. 18, 2012, which is fully incorporated by reference as if fully set forth herein. All publications noted below are fully incorporated by reference as if fully set forth herein.

BACKGROUND OF THE INVENTION

Field of the Invention

The present invention relates to optical fibers, in particular to a tool that facilitates cleaving of optical fibers to shorten their length and produce a flat end on the fiber.

Description of Related Art

There are many advantages to transmitting light energy via optical fiber waveguides and the use thereof is diverse. Single or multiple fiber waveguides may be used simply for transmitting visible light to a remote location. Complex communication systems may transmit multiple specific optical signals. These devices often require the coupling of fibers in end-to-end relationship with the coupling representing a source of light loss. The cleaved end should be smooth and defect-free. If the ends of the fiber are uneven, excessive light loss can result due to reflection and refraction of light at the cleaved end surface (e.g., a splice or juncture region). For the vast majority of fiber optic applications, it is important to cleave the fiber such that the end of the fiber is completely flat in preparation for coupling. When placing optical fibers in end-to-end relationship, to minimize light loss, it is desirable to have the end faces of the fibers be smooth and lie in a plane perpendicular, or at a specific angle, to the axis of the fibers. In short, the cleaved fiber end face needs to be a single plane that is mirror quality to optimize coupling between fibers in demountable connectors, permanent splices and photonic devices.

The relatively widespread and ever increasing utilization of optical fibers in communication systems, data processing and other signal transmission systems has created a demand for satisfactory and efficient means of inter-joining terminals. Currently most demountable fiber connectors are factory installed. For field installation of optical fibers, it is particularly desirable to develop a process that can be simply and reliably deployed to properly cleave the optical fibers so as to minimize light loss when the fibers are subsequently coupled.

An optical fiber can be cleaved to produce a flat end face by propagating crack growth in controlled fashion. In summary, optical fiber cleaving requires two principle steps: (a) scribing an annular groove around the circumference of the fiber, which serves as an initial shallow groove at the surface, and (b) applying a suitable tensile stress to cause a crack to grow and propagate across the optical fiber, beginning at the circumference and growing radially towards the center.

U.S. Patent Application Publication No. US2012/0000956 A1 (which had been commonly assigned to the assignee of the present invention, and fully incorporated by reference herein) discloses a process that can be simply and reliably deployed to properly cleave optical fibers to obtain smooth ends, so as to minimize light loss when the fibers are subsequently coupled. In accordance with the disclosure, axial tension is applied to an optical fiber that had been scored at the intended cleave location, wherein the axial tension is applied in a time-varying manner to maintain the stress intensity factor for crack on the fiber within an acceptable level to produce a stable crack growth from the circumference to towards the center at a reasonable rate to cleave the fiber. Careful control of the applied tension force with time acts to control the velocity of the propagating crack by maintaining substantially constant stress intensity factor. In one embodiment, the applied axial tension force is reduced with time and/or crack growth. As a result, the strain energy in the fiber material is released by formation of a single plane with an optical quality surface without requiring polishing. A substantially flat optical surface of enhanced optical quality is formed at the cleaved end of the optical fiber.

To facilitate the optical fiber cleaving process such as the process disclosed in U.S. Patent Application Publication No. US2012/0000956 A1, there is a need to develop an effective, convenient and reliable scribing tool to form an initial shallow circumferential groove at the surface, which could facilitate operations in field environment as well.

SUMMARY OF THE INVENTION

The present invention provides convenient and reliable scribing tools that can effectively form an initial shallow groove at the circumferential surface of an optical fiber to facilitate cleaving operations in a factory and facilitate operations in field environment as well. The design features of the inventive scribing tool can be configured in the form of a portable, hand tool, which can be deployed for easy handling in the field.

In accordance with one aspect of the present invention, the scribing tool comprises a body or housing within which the optical fiber is supported for rotation with respect to the body, about an axis of the body (e.g., a central axis). The optical fiber is constrained by supports from movements along its axis. An actuator moves a scribing bit made of a hard material (e.g., diamond, sapphire or tungsten carbide) substantially orthogonal relative to the axis of the optical fiber. By rotating the optical fiber while biasing the scribing bit against the surface of the optical fiber, a shallow groove is scribed at the circumferential surface of the optical fiber. In one embodiment, the groove extends around the entire circumference of the optical fiber. In another embodiment, the groove may extend partially around the circumference of the optical fiber.

In another aspect of the present invention, the actuator is an electro-mechanical actuator, which may be a piezoelectric actuator (e.g., made of a piezoceramic (PZT) material), a micro-machine or a nano-machine, etc. These actuators can provide nanoscale displacements that ensure that the annular groove is cut in a ductile mode that does not cause cracking within the fiber.

In one embodiment, the actuator moves the optical fiber towards the scribing bit (i.e., the axis of the optical fiber moves laterally relative to the scribing tool body, or the fiber moves in a direction orthogonal to the fiber's rotation axis). In another embodiment, the actuator moves the scribing bit towards the optical fiber, with the axis of the optical fiber retained by the supports from lateral movements relative to the scribing tool body.

In one embodiment, the scribing tool has a single scribing bit, in which case the optical fiber is required to be rotated 360 degrees in order to form a complete circumferential groove on the surface of the optical fiber. In another embodiment, the scribing tool has multiple (N) scribing bits that can be applied against the optical fiber simultaneously, in which case the optical fiber need only be rotated by 360/N degrees to form a complete circumferential groove on the surface of the optical fiber.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 8 is another end perspective view of the scribing tool in FIG. 7.

FIG. 9 is a sectional view taken along line 9-9 in FIG. 8.

DETAILED DESCRIPTION OF THE PREFERRED EMBODIMENTS

Figure 1:
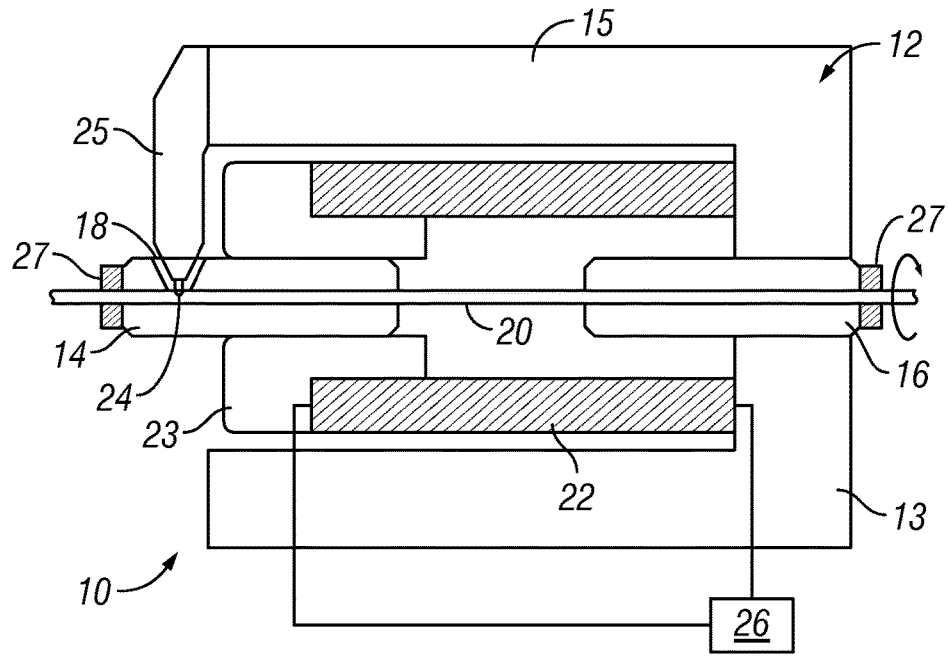
FIG. 1 is a schematic axial sectional view of a scribing tool for optical fibers, in accordance with one embodiment of the present invention.

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The inventive scribing tool is discussed in reference to a cleaving process that involves first scoring or scribing a groove into the optical fiber on its outside diameter either fully around the circumference of the fiber or in selective regions around the circumference, and then applying tension in the fiber longitudinal axis to separate two longitudinal sections of the fiber. The fiber may or may not be initially held under an axial tension when it is being scored. The score is produced mechanically by a scribing tool (also referred by some as a scoring tool). A carefully controlled scoring process provides only an initial surface groove having a desired groove depth without sub-surface damage (i.e., no cracks below the bottom surface of the scored groove); the initial groove defines the location where crack propagation across the fiber will be initiated with sufficient axial tension. Specifically, scoring of the groove produces an initial surface groove having depth of a few tens of nanometers (typically no more than 100 nanometers), whereby the scoring tool cuts the material of the fiber in a ductile mode instead of a brittle mode, thereby avoiding sub-surface cracks below the bottom of the scored grooves. Shallow depths of the cut (below few tens of nanometers) during the scoring process can be achieved by precision feeding of the scribing tool or pressing the tool against the fiber with a slight force.

In accordance with the present invention, a scribing tool is provided to effectively score the optical fiber to prepare the optical fiber for proper crack growth, with the above considerations and objectives in mind. The present invention provides a convenient and reliable scribing tool that can effectively form an initial shallow groove at the circumferential surface of an optical fiber to facilitate cleaving operations in a factory and could facilitate operations in field environment as well. The design features of the inventive scribing tool can be configured in the form of a portable, handheld tool, which can be deployed for easy handling in the field.

In accordance with one aspect of the present invention, the scribing tool comprises a body or housing within which the optical fiber is supported for rotation with respect to the body, about an axis (e.g., a central axis) of the body. The optical fiber is constrained by supports from movements along its axis. An actuator moves a scribing bit made of a hard material (e.g., diamond, sapphire or tungsten carbide) substantially orthogonal relative to the axis of the optical fiber. By rotating the optical fiber while biasing the scribing bit against the surface of the optical fiber, a shallow groove is scribed at the circumferential surface of the optical fiber. In one embodiment, the groove extends around the entire circumference of the optical fiber. In another embodiment, the groove may extend partially around the circumference of the optical fiber.

FIG. 1 schematically illustrates the centerline cross-section of a scribing tool in accordance with one embodiment of the present invention. In this embodiment, the scribing tool 10 comprises a body 12 that is generally cylindrical (e.g., having a circular, square, restangular or hexagonal cross-section, or cross-section of other geometries. A bore supporting the optical fiber 20 is defined in the body 12, e.g., by ferrules supported in the body 12. The body 12 defines a cavity including a scribing region, in which an actuator supports the optical fiber 20 for movement relative to a scribing bit 24 that is supported by an arm 25 cantilevered from the side wall 15 of the body 12. The scribing bit 24 may be made of diamond, sapphire, tungsten carbide or other hard materials that is suitable to cut the silica or glass material of the optical fiber.

In another aspect of the present invention, the actuator is an electro-mechanical actuator that converts electrical signals into a mechanical displacement. In the illustrated embodiment, the actuator is a piezoelectric actuator (e.g., made of a piezoceramic material, such as PZT (lead zirconate titanate)) in the form of a cylindrical piezoelectric tube 22, which is cantilevered at one end to the end wall 13 of the cylindrical body 12. The other end of the piezoelectric tube 22 is not supported and is free to move with respect to the cylindrical wall 15 of the body 12. The other end of the cylindrical wall 15 is open (i.e., not plugged or covered by an endcap).

As shown in FIG. 1, a bore supporting the optical fiber is defined in the body 12 by two cylindrical ferrules 14 and 16 that support the optical fiber 20. (As referenced throughout herein, the optical fiber 20 refers to a bare fiber with cladding exposed without protective buffer and jacket layers, having, e.g., a 125 µm diameter.) The ferrules may be made of zirconia, metal or other materials, which has a smooth bore sized to allow the optical fiber 20 to freely rotate therein without damage to the optical fiber. Specifically, the ferrule 16 is fixedly supported at the end wall 13 of the body 12. The ferrule 14 is fixedly supported by an endcap 23 at the free end of the piezoelectric tube 22. This ferrule 14 is provided with an opening 18 (e.g., by machining) to allow the scribing bit 24 to access the perimeter of the optical fiber 20. The optical fiber is constrained by supports from movements along its axis. This can be achieved by axial locking collars 27 provided at the external ends of the ferrules 14 and 16, which are fixed to the optical fiber 20 to restrict axial movement with respect to the ferrules but does not hinder rotational movements of the optical fiber 20 within the ferrules.

It is known that piezoceramic actuators utilize the piezoelectric effect to convert electrical signals to a mechanical displacement. In particular, a piezoceramic PZT material expands in the direction of the electrical field when voltage is applied to it. For the piezoelectric tube 22, a voltage is applied to one side (the lower side shown in FIG. 1) of the cylindrical piezoelectric tube 22 by a servo controller 26, which controls the expansion of that side of the piezoelectric tube 22. Given differential axial displacement of different portions (i.e., upper and lower portions) of the piezoelectric tube 22, this causes the piezoelectric tube 22 to bend upwards by an extent depending on the controlling voltage from the controller 26. As the piezoelectric tube 22 bends towards the scribing bit 24, the perimeter of the optical fiber 20 comes into contact with the scribing bit 24. It can be seen that the ferrule 14 also acts an anvil to support the optical fiber against the pressure of the scribing bit 24. The force of the scribing bit 24 imparted on the optical fiber 20 for scoring the optical fiber would depend on the extent of bending of the piezoelectric tube 22. The desired force appropriate to score a groove of a desired depth may be determined and the appropriate voltage applied to the piezoelectric tube 22 to produce bending of the piezoelectric tube 22 to achieve the desired force. The scribing tool 10 can be calibrated using an optical fiber prior to placing the scribing tool 10 into operation.

The control of PZT tubes is well known in the art, and will not be elaborated herein. It is noted that instead of applying voltage to only one side of the cylindrical piezoelectric tube 22 (i.e., the lower side as shown in FIG. 1), voltage (e.g., differential voltage) may be applied to the upper side and/or other sides or sections of the tube 12 to cause differential axial displacements of the sections, so as to result in net bending of the piezoelectric tube 22 towards the scribing bit 24. Further, the piezoelectric tube 22 may be controlled for bending action along more than one axis, to produce bending actions to move the ferrule 14 in/out of the sheet, up/down, and left/right, as desired.

With the scribing bit 24 pressed against the optical fiber 20, the optical fiber 20 would be manually or automatically rotated (e.g., by rotating the locking collars 27 manually or using an actuator not shown) within the ferrules, so that the scribing bit 24 could scribe an annular or circumferential groove around the perimeter of the optical fiber 20. After completing scoring the groove, the scribing bit 24 may be retracted from the optical fiber by removing control voltage or applying a reverse voltage to the piezoelectric tube 22.

In the embodiment of FIG. 1, the optical fiber 20 is generally coaxially supported within the actuator (e.g., piezoelectric tube 22). The actuator moves the optical fiber 20 towards the scribing bit 24 (i.e., the axis of the optical fiber 20 moves laterally relative to the wall 15 of the body 12) by relying on bending action of the piezoelectric tube 22.

The piezoelectric tube 22 provides support, guide and bearing for movement of the optical fiber 20, without the need for a second set of bearing and/or support. By relying on differential axial displacements of different sections of the piezoelectric tube 22 caused by piezoelectric effect to obtain a net bending action, a small variation of the force of the scribing bit 24 on the optical fiber 20 can be achieved with the differential axial displacements. The bending action of the piezoelectric tube 22 thus provides a gentle pressure by the scribing bit 24 on the optical fiber 20. The displacement of the ferrule 14 can be regulated with nanometer resolution providing extremely fine control of the depth of cut by the scribing bit 24. This is important for machining the groove in a ductile mode, which typically requires depths of cut that are less than 100 nm.

Figure 2:
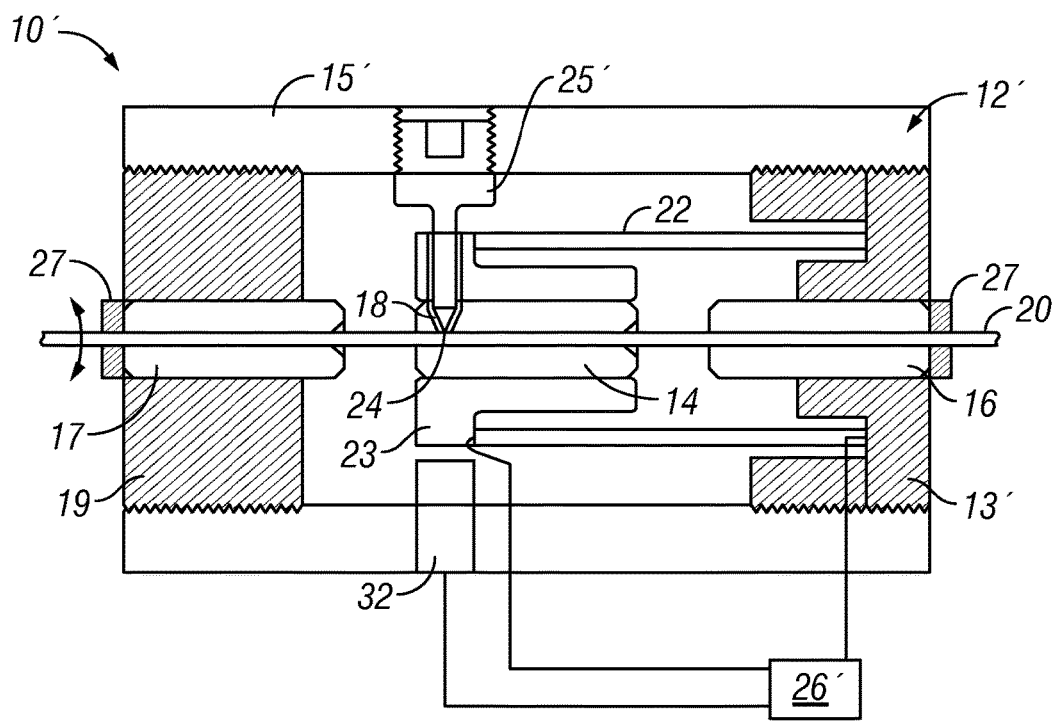
FIG. 2 is a schematic axial sectional view of a scribing tool for optical fibers, in accordance with another embodiment of the present invention.
Figure 3:
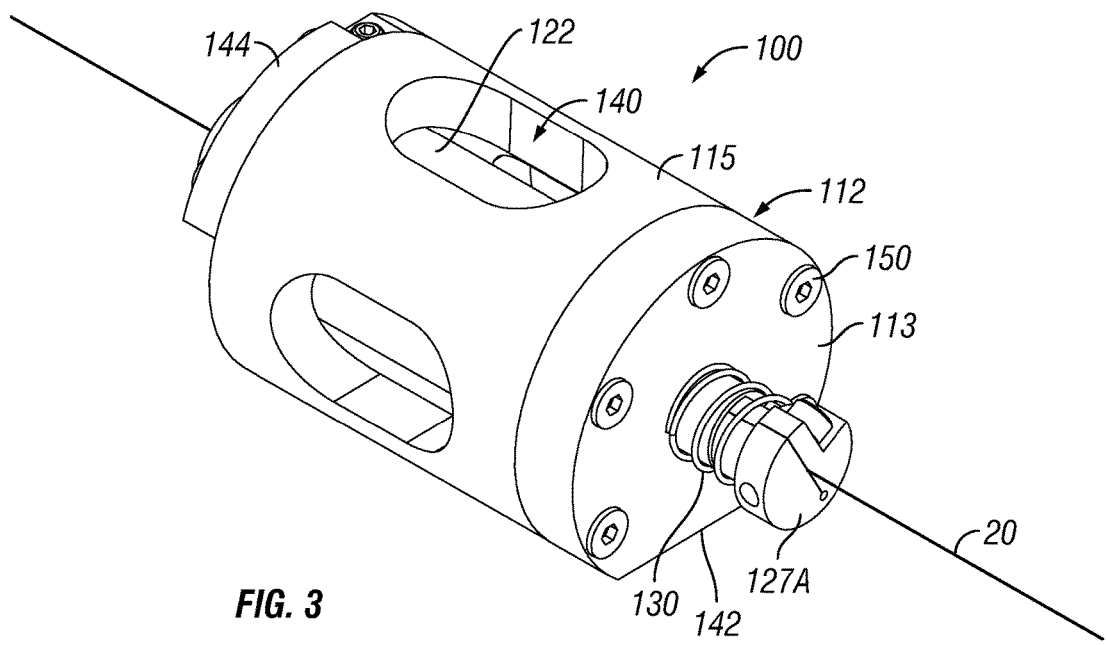
FIG. 3 is an end perspective view of a scribing tool, in accordance with a further embodiment of the present invention.
Figure 4:
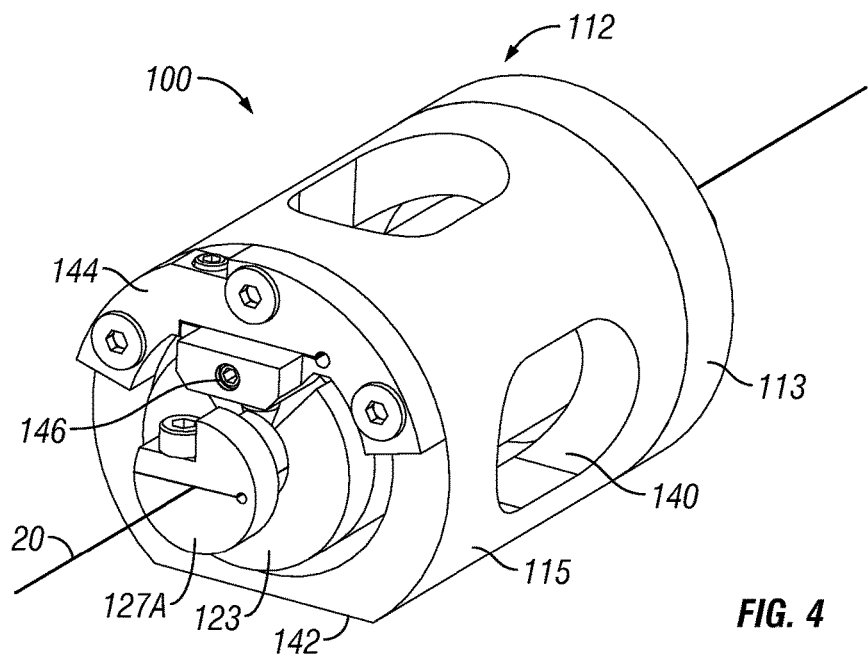
FIG. 4 is another end perspective view of the scribing tool in FIG. 3.
Figure 5:
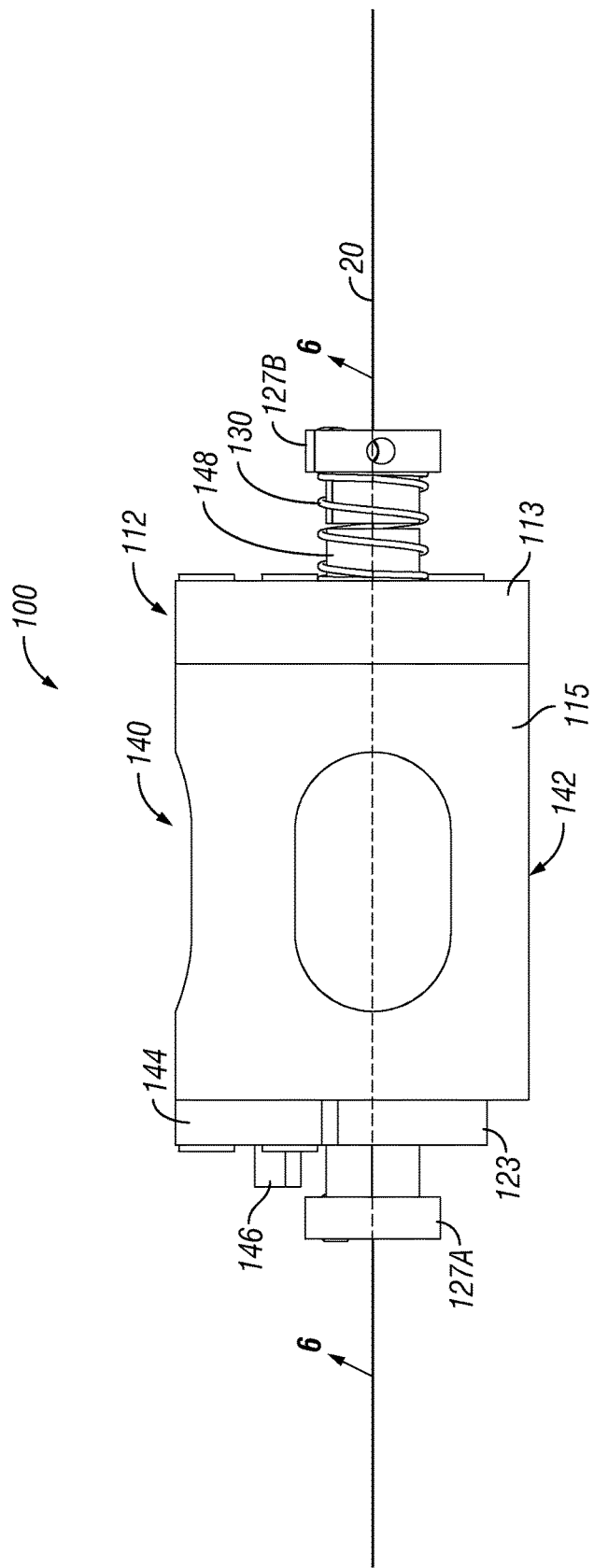
FIG. 5 is a front view of the scribing tool in FIG. 3.

FIG. 2 schematically illustrates a scribing tool in accordance with another embodiment of the present invention. This embodiment of the scribing tool 10' shares similarity with the embodiment shown in FIG. 1, with the exception of the structures noted below. In this embodiment, the body 12' of the scribing tool 10' comprises a cylindrical wall 15' and endcaps 13' and 19 fully enclosing the cavity defined in the body 12', thus fully enclosing piezo actuator tube 22 and scribing region. Three ferrules 14, 16 and 17 are shown supporting the optical fiber 20. The ferrule 16 is fixedly supported by the endcaps 13' plugged (e.g., by a threaded coupling) at one end of the cylindrical body 12'. The additional ferrule 17 is fixedly supported by the endcap 19 plugged (e.g, by a threaded coupling) at the other end of the cylindrical body 12'. Instead of supporting the scribing bit 24 by a cantilevered arm, the scribing bit 24 is supported by structure 25' extending from the cylindrical body 12' by a variable attachment (e.g., a threaded attachment). The threaded attachment provides adjustments to set the initial or nominal location the scribing bit 24 close to the optical fiber 20 prior to initiating scribing operation by bending the piezoelectric tube 22. This allows for periodic adjustments or replacement of the scribing bit 24 to accommodate wear of the scribing bit. The displacement of the piezoelectric tube 22 is controlled by servo controller 26' as in the case of the embodiment in FIG. 1. In this embodiment, a displacement sensor 32 is provided which measures the displacement at the end of the piezoelectric tube 22 as a feedback signal to the controller 26'. This would provide for continuous adjustment under prescribed control of the depth of cut in the optical fiber 20. Furthermore, the displacement of the piezoelectric tube 22 may be synchronized with the rotation of the optical fiber 20. The embodiment of FIG. 1 may be modified to provide similar displacement sensor and associated controller.

While the above discussed embodiments illustrate scribing tools having a single scribing bit, it is well within the scope and spirit of the present invention to provide additional scribing bits that can be sequentially or simultaneously applied to the rotating optical fiber. For example, in the embodiment of FIG. 2, it may be further modified to provide two or more scribing bits (not shown) that are circumferentially distributed (e.g., axially symmetrically or evenly distributed by equal radial angular spacing) with respect to the optical fiber axis. The piezoelectric tube 22 is controlled to displace radially away from the fiber axis in a manner to press the scribing bits against the optical fiber, with each scribing bit scoring a circumferential segment around the optical fiber. The depth of cut for the scribing tools is controlled by the piezoelectric tube 22. The displacement sensor 32 detects the position and displacement of the optical fiber. Instead of having to rotate the optical fiber by 360 degrees in order to form a complete circumferential groove on the surface of the optical fiber using a single scribing bit as in the case of FIGS. 1 and 2, by using N number of scribing bits in the present embodiment, the optical fiber need only be rotated by 360/N degrees to form a complete circumferential groove on the surface of the optical fiber. This is very advantageous when the opposite end of the optical fiber may be wound on a coil or attached to another device.

FIGS. 3 to 6 schematically illustrate a scribing tool in accordance with further embodiment of the present invention. This embodiment represents a product implementation including additional modifications to the embodiments of FIGS. 1 and 2 discussed above, and more particularly FIG. 1. Otherwise, the structure and operation that implements displacement of the optical fiber in this embodiment is quite similar to the earlier embodiments.

In this embodiment, the scribing tool 110 comprises a body or housing 112 having a generally cylindrical wall 115, with a flat surface 142 at one side, and openings 140 provided in the curved sections of the wall 115. The openings 140 provide ventilation for heat built up at the interior of the body 112, and access to the interior of the body 112 (e.g., passage of electrical wiring). The body 112 defines a cavity, in which an actuator supports the optical fiber 20 for movement relative to a scribing bit 124 that is supported by an arm 125 cantilevered from the wall 115 of the body 112. Unlike the embodiment of FIG. 1, the arm 125 is fixed in position, by locking set screw 146, with respect to the base plate 144 that is fastened to the end of the body wall 115. This allows flexibility for adjustments to set the initial or nominal location of the scribing bit 124 with respect to the optical fiber 20 prior to a scribing operation. This also allows for easy replacement of the scribing bit 124 and/or its support arm 125.

The actuator is a piezoelectric actuator in the form of a cylindrical piezoelectric tube 122, which may be similar to the tube 12 in FIG. 1. The tube 122 is cantilevered at one end to the end wall 113 attached to one end of a cylindrical wall 115 by bolts 150. The other end of the tube 122 is not supported and is free to move with respect to the cylindrical wall 115 of the body 112. The other end of the cylindrical wall 115 is open (i.e., not plugged or covered by an endcap).

Figure 6:
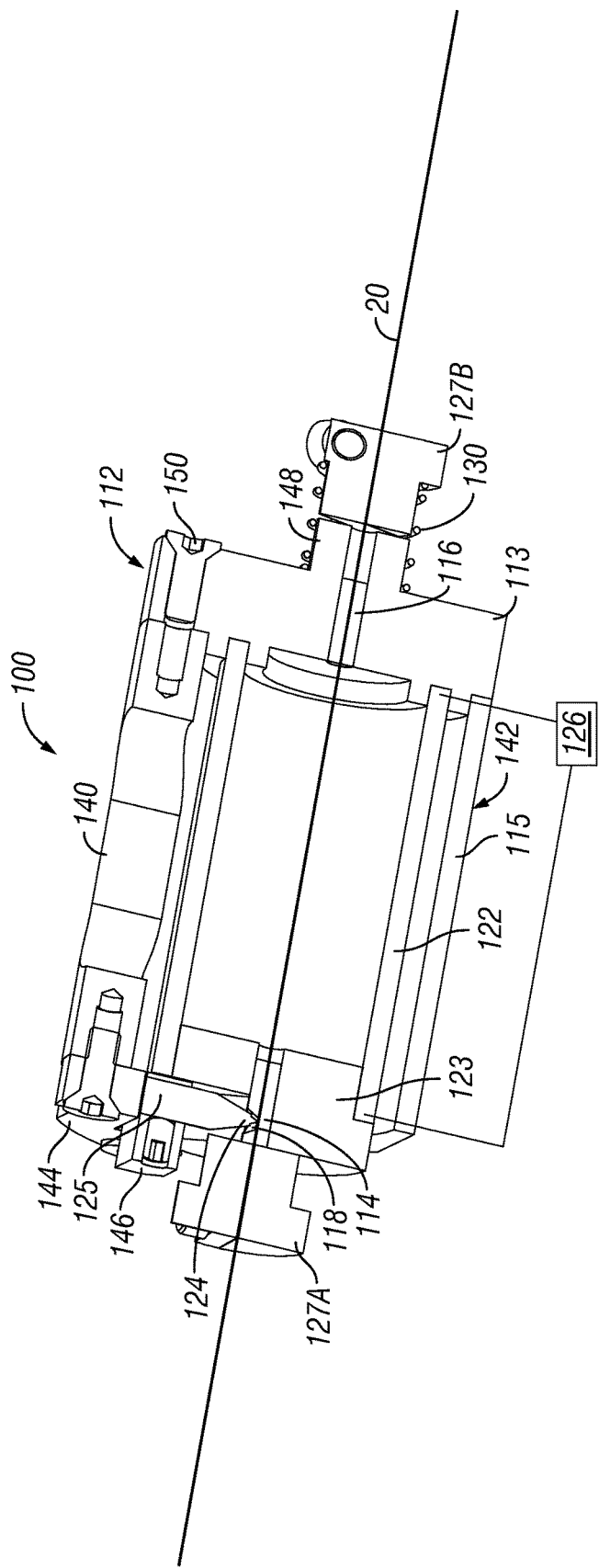
FIG. 6 is a sectional view taken along line 6-6 in FIG. 5.

As better shown in FIG. 6, two cylindrical ferrules 114 and 116 supports the optical fiber 20. Specifically, the ferrule 116 is fixedly supported at the end wall 113 of the body 112. The ferrule 114 is fixedly supported by an endcap 123 at the free end of the tube 122. This ferrule 114 is provided with an opening 118 (e.g., by machining) to allow the scribing bit 124 (e.g., a diamond bit) to access the perimeter of the optical fiber 20. The optical fiber is constrained by supports from movements along its axis. This is achieved by axial locking collars 127A and 127B providing at the external ends of the ferrules 114 and 116, which clamp the optical fiber 20 to restrict axial movement with respect to the ferrules but do not hinder rotational movements of the optical fiber 20 within the ferrules. In this embodiment, the locking collar 127B at one end is biased by a compression spring 130, which applies a slight tension to the optical fiber 20, pulling the optical fiber 20 to keep the collar 127A against the endcap 123. Under bias of the spring 130, the collar 127B is slightly spaced apart from the stub 148 that extends from the end wall 113, and is free to rotate within the coil spring 130.

A voltage is applied to one side (the lower side shown in FIG. 1) of the cylindrical tube 122 by a servo controller 26, which controls the expansion of that side of the tube 122. Given differential axial displacement of different portions (i.e., upper and lower portions) of the tube 122, this causes the tube 122 to bend upwards by an extent depending on the controlling voltage from the controller 126, as was in the case of FIG. 1. The scribing tool is used to score a groove around the perimeter of the optical fiber 20 in a similar manner as in the case of FIG. 2, which will not be repeated here. It is noted that the user rotates the optical fiber 20 by turning the collars 127A and 127B (manually or using an actuator not shown). The flat surface 142 provides a convenient reference surface against which the body 112 is prevented from rotating when the collars 127A and 127B are rotated. For example, the flat surface 142 is placed on a support surface, such as a work table or an external bracket (not shown), when the collars 127A and 127B are turned.

In a further embodiment, instead of moving the optical fiber towards the scribing bit, the actuator moves the scribing bit towards the optical fiber, with the axis of the optical fiber retained by the supports from lateral movements relative to the scribing tool body.

Figure 7:
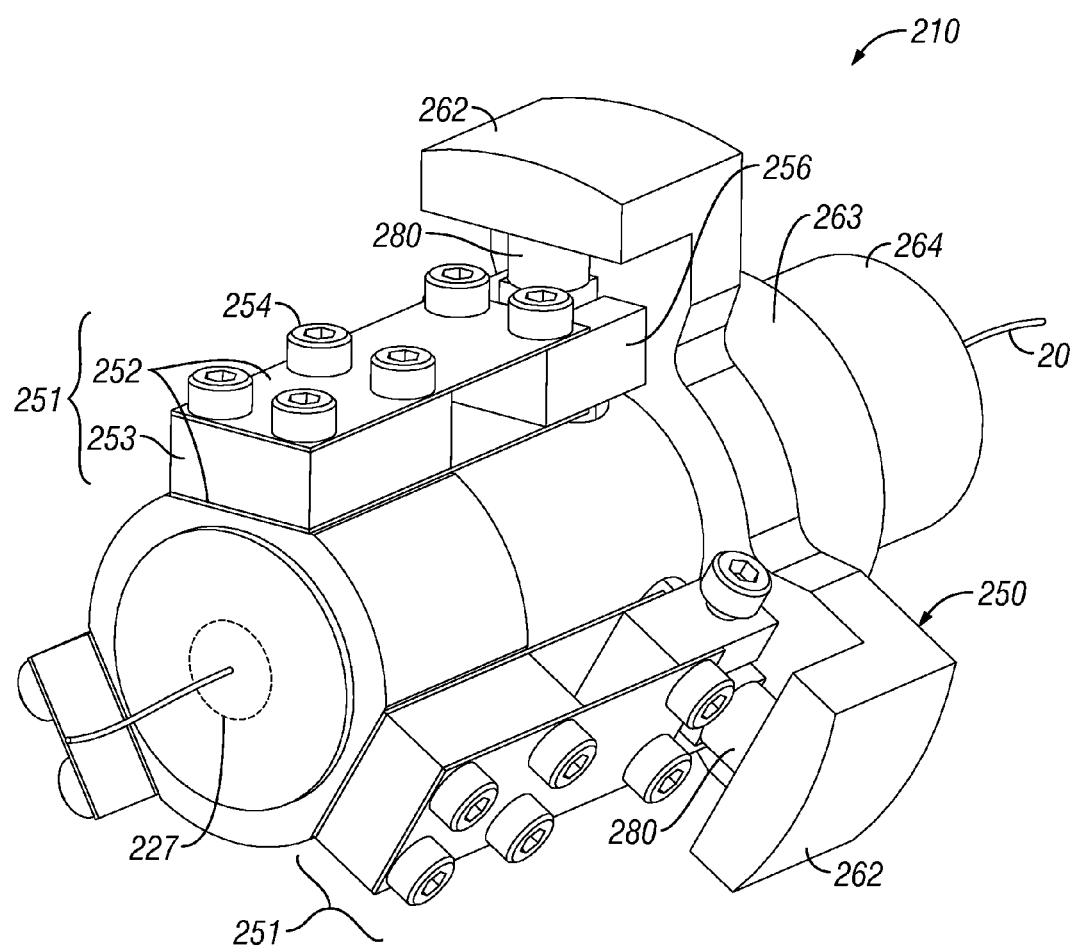
FIG. 7 is an end perspective view of a scribing tool in accordance with a further embodiment of the present invention.
Figure 10:
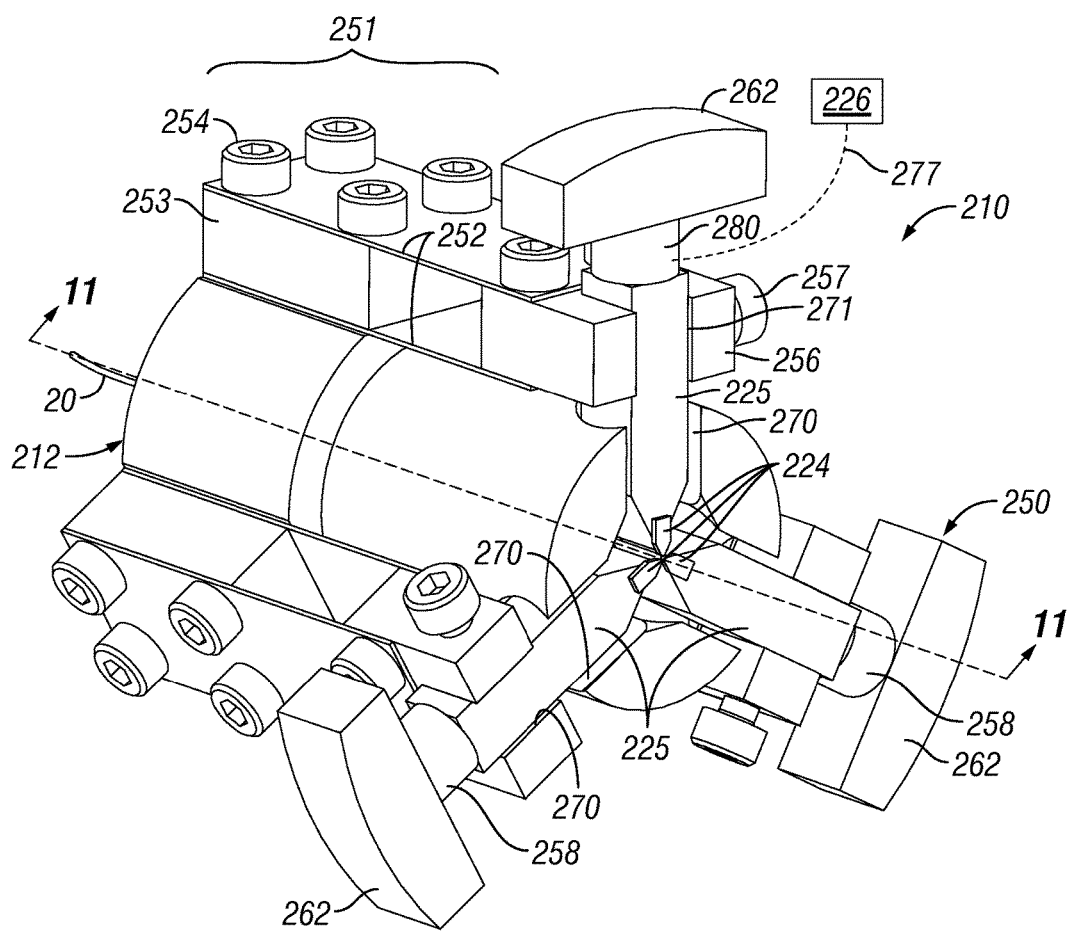
FIG. 10 is a sectional view taken along line 10-10 in FIG. 8.
Figure 11:
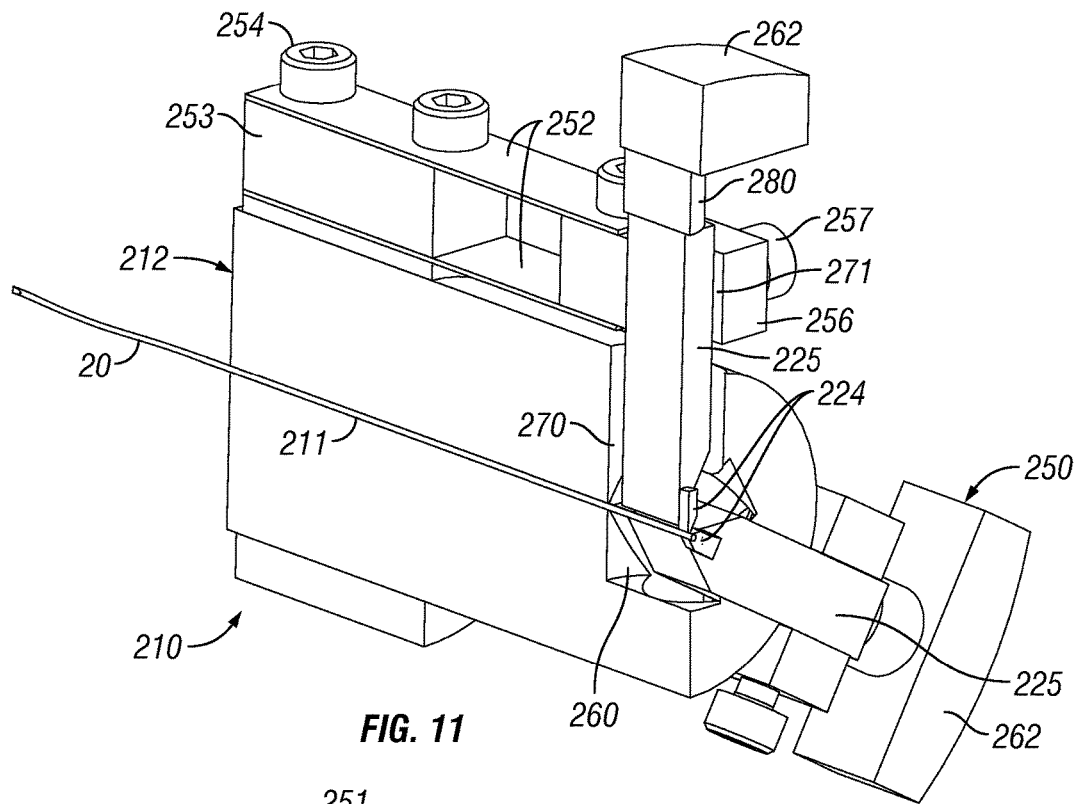
FIG. 11 is a sectional view taken along line 11-11 in FIG. 10.

FIGS. 7-11 illustrate a scribing tool in accordance with such further embodiment. FIGS. 7 and 8 are perspective external views of a scribing tool 210. In this embodiment, there are three scribing bits (i.e., N=3) applied to the optical fiber 20. FIG. 9 is a sectional view taken along line 9-9 in FIG. 8; FIG. 10 is a sectional view taken along line 10-10 in FIG. 8; and FIG. 11 is a sectional view taken along line 11-11 in FIG. 10.

The scribing tool 210 has a generally cylindrical body 212 and a collar 250 attached to one end of the body. The body 212 has a generally solid interior, with a small fiber scribing region 260 defined within the body, and a bore along its axis supporting the optical fiber 20 through the scribing region 260. The body 212 having the bore 211 essentially functions as a ferrule supporting the length of the optical fiber through the scribing region 260. The optical fiber 20 is constrained by supports from movements along its axis. This can be achieved by axial locking collars 227 (schematically represented by dotted lines) provided at the external ends of the body 212, which may have similar structure as the collars 27 or 127 in the previous embodiments. The collars 227 are fixed to (e.g., clamped onto) the optical fiber 20 to restrict axial movement with respect to the ferrules but does not hinder rotational movements of the optical fiber 20 within the ferrules. The fiber may be rotated by turning the collars 227.

The scribing region has three channels 270 opened to the sides of the cylindrical body 212, which allow access by scribing bits 224 supported at the tip of arms 225. There is sufficient clearance provided between each arm and the walls of the channel 270 to allow free movement of the arm. The channels 270 extend radially from scribing region, at equal angular spacing, receiving the arms 225.

In this embodiment, there are as many flexible supports 251 as the number of scribing bits 224, which are attached to the exterior of the cylindrical body 212. The flexible supports are distributed at equal radial angular spacing about the circumference of the body 212. In the illustrated embodiment, each flexible support 251 comprises two cantilevered flexible thin plates 252, which are separated by and clamped onto a block 253. The flexible support 251 is attached to the body 212 by fasteners 254. At the end of the flexible support 251 towards the channel 270, a U-shaped yoke 256 is attached between the plates 252. The yoke 256 has a cutout 271 (which defines the opening in the U-shaped yoke), which receives the arm 225. The arm 225 is secured to the yoke by a set screw 257, which allows flexibility for adjustment and fixing the initial (or nominal) position of the scribing bit 224 with respect to the optical fiber 20, prior to activating the actuator to implement scribing operation. In the illustrated embodiment, all the flexible supports 251 are identical.

The collar 250 has a cylindrical base 263 and fingers 262 extending therefrom. There are as many fingers 262 as there are scribing bits 224/arms 225. The cylindrical base 263 is inserted over the cylindrical body 212, exposing section 264 of the body 212. However, the base 263 and/or the body 212 may be sized so that there is the portion 264 is not exposed by the base 263. Each finger 262 extends over the end of a channel 270/arm 225 (i.e., the finger 262 is position along the axis of the channel 270/arm 225).

In the illustrated embodiment, the actuator to displace the scribing bit 224 relative to the optical fiber 20 is supported between the finger 262 and the end of the arm 225. Specifically in this embodiment, the actuator at each finger 262 is in the form of a piezo element 280, which is configured with electrical inputs not specifically shown in the figures, but schematically shown in FIG. 10 by dotted line 277 leading to a controller 226. The piezo element 280 is configured to expand/contract in reference to the supporting finger 262, to displace the arm at least in the direction of the axis of the arm 225, to press against or retract from the optical fiber 20. The scribing bits 224 are actuated by the piezo elements 280 to move in a direction radially with respect to the optical fiber 20 or its rotation axis.

Scribing operation is undertaken by appropriately controlling the displacements of the piezo elements for the arms 225/scribing bits 224. The optical fiber 20 is rotated by turning the collars 227 that are clamped to the fiber at the ends of the bore.

While it is not shown in the figures, a suitable cover may be provided to protect some of the structures external of the body 212 (e.g., the flexible supports 251) for easy handling of the scribing tool at the field.

In one embodiment, the optical fiber 20 is generally coaxially supported within the ring of actuators (e.g., piezo elements 280) located about the axis of the optical fiber 20. The rotational axis of the optical fiber 20 is substantially aligned with the center (e.g., center of gravity, center of mass, centroid, geometric center) of the overall body 212 of the scribing tool 210. As referred herein, substantially aligned means alignment of the spin axis and one of the centers is within 0-25%, or 0-15%, or 0-10%, or 0-5% of the characteristic diameter of the body 212. This facilitates rotation of the body 212 with respect to the optical fiber 20 (e.g., holding the fiber 20 stationary and rotating the body 212), as the scribing would be better balanced to avoid wobbling of the body as it is being rotated about the fiber (which could lead to unintended breakage of the fiber). Further, the body 212 of the scribing tool 210 can be configured with structural features that are substantially axial symmetric, so that a more balanced weight distribution to facilitate turning of the body. This makes handling of the scribing tool 210, if it is implemented as a hand tool, much easier in the field. The same design consideration and structural configurations implementing the above discussed alignment requirement can apply to the earlier embodiments discussed above in reference to FIGS. 1-6, as an alternate embodiment.

In the multi-scribing bit embodiment of the inventive scribing tool disclosed above, the scribing tool has multiple (N) scribing bits that can be applied against the optical fiber simultaneously, in which case the optical fiber need only be rotated by 360/N degrees to form a complete circumferential groove on the surface of the optical fiber. This reduces the relative angle through which the fiber and tool must be rotated. This is very beneficial for field termination, where a long cable may not easily be rotated multiple times or even 360 degrees.

It can be appreciated that each flexible support 251 having the yoke 256 provides a floating structure to facilitate adjustments to set initial alignment and to maintain set alignment of the arm 225 in a direction parallel to the fiber axis and its orthogonal direction within the channel 270, as well as to support the arm to set the nominal position of the arm 225 that supports the scribing bit 224. In essence, the flexible support 251 provides a flexible or spring bearing for the supported arm 225. Without the flexible support 251, the lateral and vertical alignments of the arm 225 would rely entirely on the support of the piezo element 280, which might challenge the structural integrity of the assembly, since the arm 225 would be cantilevered from the fingers via the piezo element 280. As the piezo element 280 displaces the arm towards the optical fiber 20, the extension of the piezo element 280 acts against the backing support of the finger 262 and the bias of the flexible support 251. Upon retracting the piezo element, the spring support 251 also facilitates retracting the arm 225 away from the optical fiber 20.

Scribing is achieved by axial locking collars 127A and 127B providing at the external ends of the ferrules 114 and 116, which clamp the optical fiber 20 to restrict axial movement with respect to the ferrules but do not hinder rotational movements of the optical fiber 20 within the ferrules.

Figure 12:
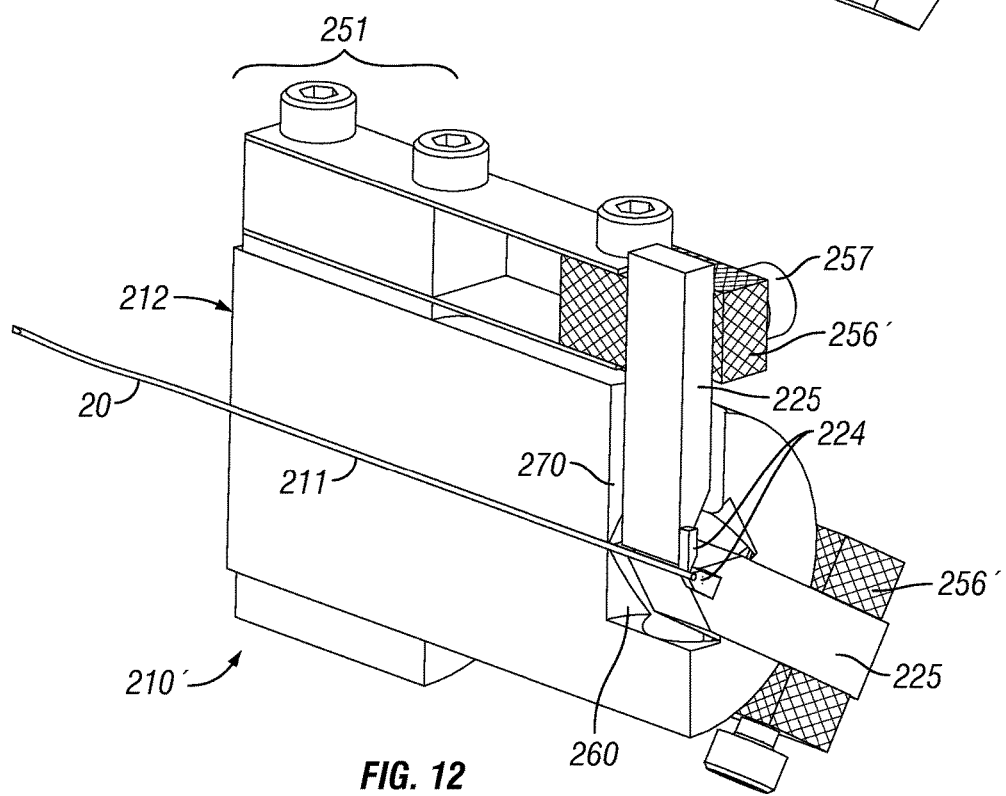
FIG. 12 is a partial sectional view of a scribing tool in accordance with an alternate embodiment of the present invention.

FIG. 12 is the same partial sectional view taken along the same section in comparison to FIG. 11 (with the portion 264 of the body 212 not shown), which illustrates an alternate embodiment in which the collar 250 in the prior embodiment can be omitted. In this embodiment, instead of providing a piezo element at the end of the arm 225, the yoke 256' is made of a piezo material. Accordingly, the yoke 256' provides support for alignment, as well as actuation of the arm 225 for scribing the optical fiber 20. All other structures are similar to the previous embodiment.

In a further embodiment not illustrated, there may be more or less spring plates in the flexible support than as shown. For example, there may be a single spring plate 252 in the support, which may be cantilevered either on top or below the block 253, or intermediate between two blocks (not shown).

* * *

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. An optical fiber scribing tool, comprising:
    a body;
    at least a scribing bit supported on the body; and
    an actuator attached to the body and configured to move an optical fiber section of an optical fiber relative to the scribing bit, so as to scribe a groove extending at least partially along a circumference of the optical fiber section with a rotation of the optical fiber section, wherein the actuator has an elongated body, a first end and a second end, and an elongated bore at each of the first end and the second end configured to rotatably support the optical fiber section of the optical fiber with respect to the scribing bit, and a support at each of the first end and the second end of the actuator to constrain axial movement of the optical fiber section within the bore and with respect to the support.

2. The optical fiber scribing tool as in claim 1, wherein the body further defines a cavity including a scribing region in which the optical fiber section is scribed by the scribing bit.

3. The optical fiber scribing tool as in claim 2, wherein the actuator comprises an electromechanical actuator.

4. The optical fiber scribing tool as in claim 3, wherein the electromechanical actuator comprises a piezoelectric actuator.

5. The optical fiber scribing tool as in claim 4, wherein the piezoelectric actuator comprises a piezoelectric structure coaxial with a rotation axis.

6. The optical fiber scribing tool as in claim 5, wherein the optical fiber section is supported by the piezoelectric actuator for movement substantially orthogonal to the rotation axis.

7. The optical fiber scribing tool as in claim 6, wherein the piezoelectric actuator comprises a piezoelectric tube disposed in the cavity surrounding the optical fiber section about the rotation axis.

8. The optical fiber scribing tool as in claim 7, wherein the piezoelectric actuator further comprises a controller configured to bend the piezoelectric tube to move the fiber towards the scribing bit.

9. The optical fiber scribing tool as in claim 8, wherein the piezoelectric tube is cantilevered from the first end of the actuator.

10. The optical fiber scribing tool as in claim 9, wherein the first end of the actuator is an end wall attached to the body.

11. The optical fiber scribing tool as in claim 10, wherein the optical fiber section is supported by a ferrule defining the bore at the end wall, wherein the bore supports the optical fiber section for rotation about a rotation axis.

12. The optical fiber scribing tool as in claim 2, wherein the rotation axis is substantially aligned with a center of the body.

13. The optical fiber scribing tool as in claim 1, wherein the optical fiber section is supported by at least a ferrule defining the bore at each of the first end and second end of the actuator, wherein the bore supports the optical fiber section for rotation about a rotation axis.

14. The optical fiber scribing tool as in claim 1, wherein the scribing bit is supported in relation to the optical fiber section to scribe the groove to extend around the entire circumference of the optical fiber section with rotation of the optical fiber section.

15. The optical fiber scribing tool as in claim 1, wherein the first end of the actuator is attached to the body.

16. The optical fiber scribing tool as in claim 15, wherein the first end of the actuator is an end wall attached to the body.

17. The optical fiber scribing tool as in claim 16, wherein the optical fiber section is supported by a ferrule defining the bore at the end wall, wherein the bore supports the optical fiber section for rotation about a rotation axis.

18. The optical fiber scribing tool as in claim 15, wherein the second end of the actuator is configured to be moved towards the scribing bit.

19. The optical fiber scribing tool as in claim 15, wherein the second end of the actuator is attached to the body.

20. The optical fiber scribing tool as in claim 19, wherein the second end of the actuator is an endcap attached to the body.

21. The optical fiber scribing tool as in claim 20, wherein the optical fiber section is supported by a ferrule defining the bore at the endcap, wherein the bore supports the optical fiber section for rotation about a rotation axis.

* * * * *